Patented Sept. 14, 1926.

1,600,161

UNITED STATES PATENT OFFICE.

RAYMOND W. BELL, OF WASHINGTON, DISTRICT OF COLUMBIA, DEDICATED TO THE GOVERNMENT AND THE PEOPLE OF THE UNITED STATES.

PROCESS OF SEPARATING PROTEINS AND OTHER MATTER FROM WHEY IN SOLUBLE FORM.

No Drawing.    Application filed April 15, 1926.  Serial No. 102,323.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

After removing the casein and fat from milk there remain in the serum a certain amount of milk sugar, milk albumen and milk salts. This process of recovering the albumen (lactalbumen, lactoglobulin and whatever other proteins may be present) is as follows:—The fat and casein are removed from milk. The milk serum (whey) thus obtained has an acid reaction which is adjusted to a hydrogen ion concentration of about $pH$ 7.0 on the Sorensen scale. This $pH$ value may be somewhat less or a little greater than that mentioned without defeating the purpose of adding the alkali, which is to facilitate the separation of the crystallized lactose from the serum of the condensed whey. In adjusting the reaction of the whey to the proper hydrogen ion concentration sodium hydroxide or any other suitable alkali may be used. After the proper reaction of the whey has been attained, the whey is forewarmed to a temperature of about 60° C. and concentrated at a temperature below the coagulating point (72° C.) of lactalbumen to a concentration at which the lactose just fails to crystallize in the pan of the condenser. At 50° C. this concentration is 61.0 per cent total solids or 31.0° Baumé. The evaporation is done most efficiently in a vacuum pan, but it is not essential to the process that a vacuum pan be used. It is essential, however, that the whey be maintained at the proper reaction and temperature at all times. The concentrated whey is removed from the condenser into a suitable container or containers and held by any convenient means at a temperature of about 0.0° C. or lower. After sufficient time has elapsed (which may be overnight or longer) for maximum crystallization of the lactose to take place the product is removed from the cooler and stirred. The crystallized lactose is removed as soon as possible thereafter by a filter press of the proper type or by running the mother liquid through a sugar centrifugal. In either case the sugar obtained may be further purified by washing in the filter or centrifugal with a small amount of cold water. The filtrate will still contain in solution a certain amount of lactose which, if desired, may be partially removed by further concentration crystallization and a second filtration or centrifugalization. The filtrate still contains, in addition to the proteins before mentioned, some lactose and most of the milk salts of the original whey. The milk salts and some of the lactose may be removed by passing the filtrate through a continuous dializer. A small electric current may be used to hasten the rate of dialysis in which case the process of removing the salts and some lactose is called electrodialysis. During electrodialysis there is a small loss in total protein material. This dialysis or electrodialysis may be omitted if it is not desirable to remove the salts. The resulting concentrated albumen solution contains lactose and salts in varying concentration but the total protein content should exceed either the per cent lactose or the per cent salts. At this point the hydrogen ion concentration of the concentrated albumen solution is adjusted to about $pH$ 7.3. This $pH$ value may be somewhat less or a little greater than that mentioned without defeating the purpose of adding the alkali which is to improve the physical properties of the powder which is obtained by removing the water from the concentrated albumen solution. The water may be removed by any method which does not heat the albumen above the coagulating point. The powder so obtained contains most of the proteins of the original whey, some milk sugar and some of the salts of milk. These constituents are all in soluble form, and can be converted back to their original condition by the addition of water. The resulting powder has many of the physical and chemical properties of egg albumen and serum albumen and can be used as a substitute for (or in place of) these products.

I claim:

A process for separating in soluble form proteins and other matter from whey, consisting in removing the casein and fat in the milk so as to obtain whey the acid reaction of which is adjusted to a $p$H of about 7.0 by the addition of suitable alkali, forewarming the whey thus treated to about 60° C., concentrating the whey at a temperature below the coagulating point of the albumen contained therein to a concentration at which the lactose just fails to crystallize, cooling the concentrate to about 0.0° C., maintaining such last named temperature until a maximum crystallization of the lactose has taken place, removing the lactose crystals by any suitable means, such as centrifuging, and reducing the salts by electrodialysis if desirable, adjusting the reaction of the concentrated albumen solution to a $p$H of about 7.3, and finally removing the greater part of the remaining water by drying at a temperature below the coagulating point of albumen, the resulting soluble powder containing practically all of the proteins, a part of the salts, and a small part of the lactose of the whey.

RAYMOND W. BELL.